(12) United States Patent
Hirota

(10) Patent No.: US 12,337,892 B2
(45) Date of Patent: Jun. 24, 2025

(54) STEERING DEVICE

(71) Applicant: TOYODA GOSEI CO., LTD., Kiyosu (JP)

(72) Inventor: Itsuhiko Hirota, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/933,100

(22) Filed: Oct. 31, 2024

(65) Prior Publication Data

US 2025/0162641 A1 May 22, 2025

(51) Int. Cl.
*B62D 1/04* (2006.01)
*B60Q 3/283* (2017.01)
*F21V 5/04* (2006.01)

(52) U.S. Cl.
CPC ............ *B62D 1/046* (2013.01); *B60Q 3/283* (2017.02); *F21V 5/04* (2013.01)

(58) Field of Classification Search
CPC ............ B62D 1/046; B60Q 3/283; F21V 5/04
USPC ................................................ 362/488, 23.19
See application file for complete search history.

(56) References Cited

U.S. PATENT DOCUMENTS

| 11,493,365 B2* | 11/2022 | Heishi ..................... F21V 14/06 |
| 11,971,164 B1* | 4/2024 | Kojima .................... F21V 5/04 |
| 2021/0221285 A1* | 7/2021 | Kihara ................... B60K 35/60 |

FOREIGN PATENT DOCUMENTS

JP 2018-111440 A 7/2018

* cited by examiner

*Primary Examiner* — Laura K Tso
(74) *Attorney, Agent, or Firm* — Posz Law Group, PLC

(57) ABSTRACT

A steering device comprises: a rotary part provided in a manner allowing rotation about a rotary axis; a peripheral part arranged at a position farther from the rotary axis than the rotary part, and having a size in a direction of the rotary axis smaller than a size thereof in a direction of the rotation; and a light-emitting part provided at the rotary part. The light-emitting part includes: a light-emitting element; and a light-transmitting cover. The light-transmitting cover includes: a first surface where light from the light-emitting element is received; and a second surface on an opposite side to the first surface, and emitting the light received at the first surface toward the peripheral part. The light-transmitting cover includes: an inclined portion configured in such a manner that, as getting farther from the peripheral part along the second surface, the first surface gets closer to the second surface.

5 Claims, 6 Drawing Sheets

STEERING DEVICE

CROSS REFERENCE TO RELATED APPLICATIONS

The present application claims the priority based on Japanese Patent Application No. 2023-197118 filed on Nov. 21, 2023, the disclosure of which is hereby incorporated by reference in its entirety.

BACKGROUND

Field

The present disclosure relates to a steering device.

Related Art

There has conventionally been an illumination device that illuminates a wheel part of a steering device. Japanese Patent Application Publication No. 2018-111440 shows a steering wheel illumination device mounted with light-emitting parts in a pair to emit visible light to a pad part and right and left spoke parts. Each of the light-emitting parts emits light toward the wheel part. Each of the light-emitting parts is capable of emitting light of an arbitrary color. Each of the light-emitting parts is capable of changing the intensity of light. As a result, the steering wheel illumination device of Japanese Patent Application Publication No. 2018-111440 becomes capable of encouraging a driver to grip the wheel part, for example, using the light illuminating the wheel part.

The steering device is mounted with a large number of units such as a core metal, an airbag, an electronic control unit (ECU), a harness for connecting electronic devices including the ECU, and others. At the steering device, space for mounting the above-described light-emitting parts is limited by these units. Hence, in some cases, it is impossible to mount a steering device with a light-emitting part to emit light of a large quantity. In other cases, it is impossible to mount the steering device with a light-emitting part in a posture by which an optical axis of light emitted from the light-emitting part is pointed toward a part of a wheel part visible from a driver. In such cases, the part of the wheel part visible from the driver is not illuminated with light of sufficient brightness. This arises a desire for a technique for illuminating a part of the steering device properly.

SUMMARY

The present disclosure is feasible in the following aspects.

According to one aspect of the present disclosure, a steering device for a moving object is provided. The steering device comprises: a rotary part provided in the moving object in a manner allowing rotation of the rotary part about a rotary axis; a peripheral part connected to the rotary part, arranged at a position farther from the rotary axis than the rotary part, and having a size in a direction of the rotary axis smaller than a size thereof in a direction of the rotation; and a light-emitting part provided at the rotary part. The light-emitting part includes: a light-emitting element that emits light; and a light-transmitting cover that covers the light-emitting element and transmits the light therethrough. The light-transmitting cover includes: a first surface where the light emitted from the light-emitting element is received; and a second surface located on an opposite side to the first surface, forming a part of an outer surface of the steering device, and emitting the light received at the first surface toward the peripheral part. The light-transmitting cover includes: a inclined portion configured in such a manner that, as getting farther from the peripheral part along the second surface, the first surface gets closer to the second surface in a sectional plane including a direction parallel to the rotary axis and an optical axis of the light received at the first surface, or configured in such a manner that, as getting farther from the peripheral part along the second surface, the first surface gets farther from the second surface in the sectional plane.

DETAILED DESCRIPTION

A. First Embodiment

A1. Configuration of Steering Device

Figure 1:
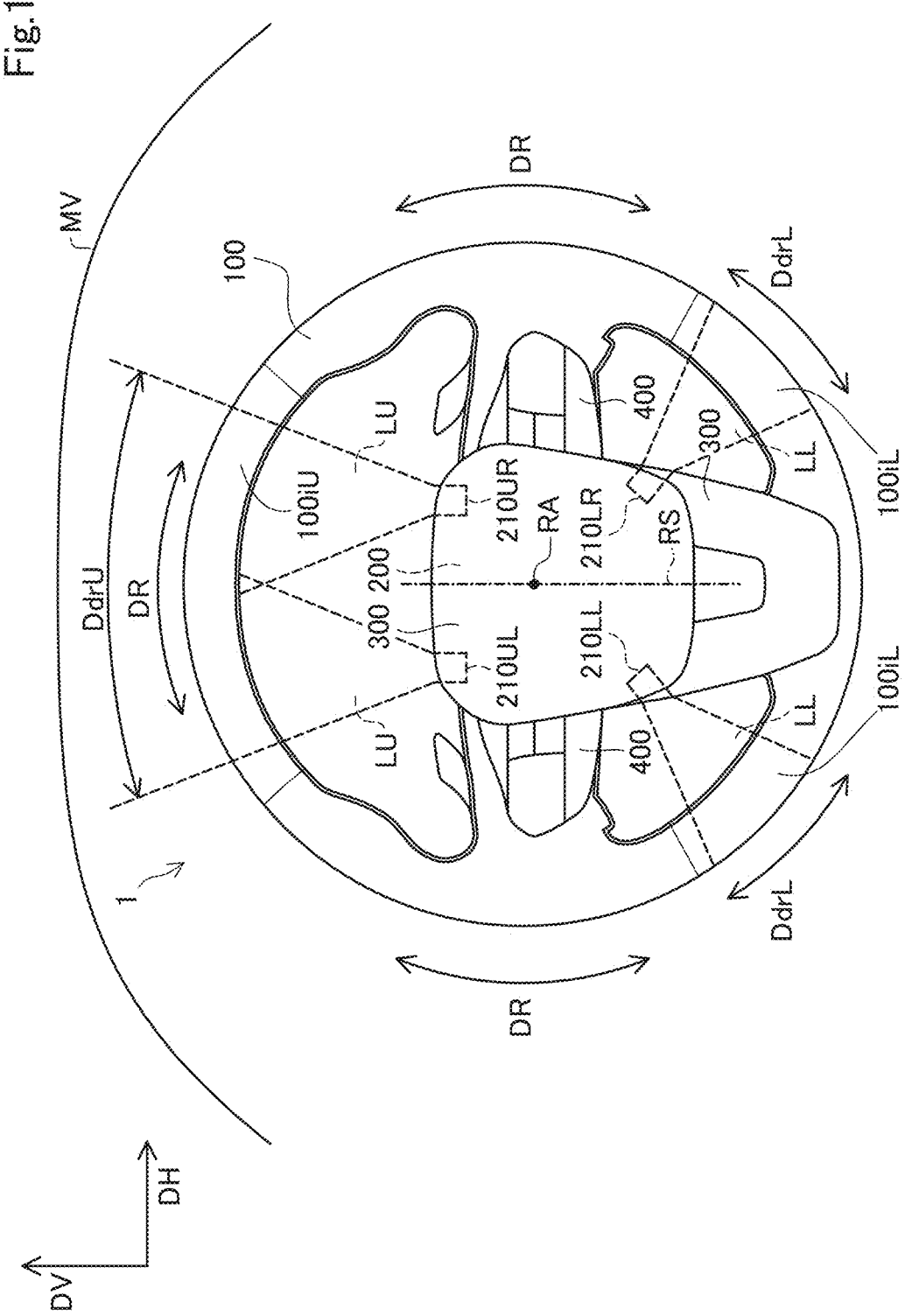
FIG. 1 is a front view of a steering device 1 according to a first embodiment.

FIG. 1 is a front view of a steering device 1 according to a first embodiment. The steering device 1 is mounted on a vehicle MV. The steering device 1 is operated by a driver of the vehicle MV for controlling a traveling direction of the vehicle MV.

Figure 2:
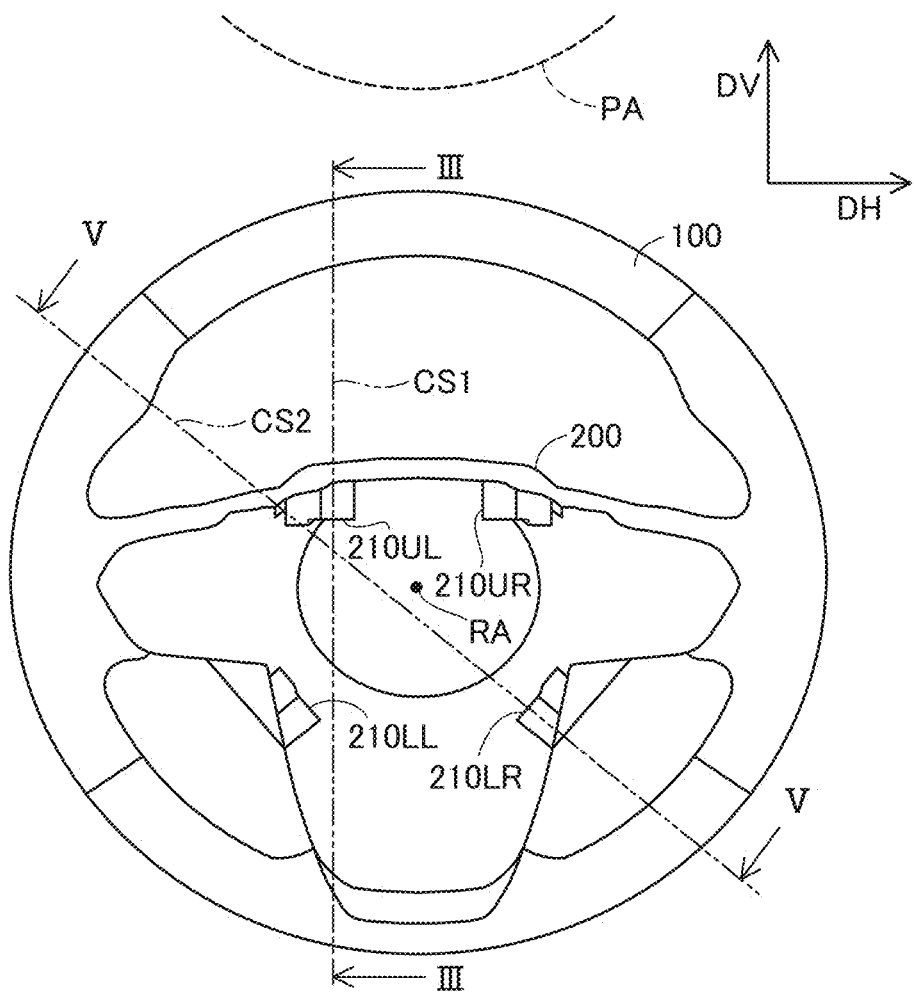
FIG. 2 is an explanatory view showing a relationship between the steering device 1 and a position PA of the head of a driver.

FIG. 2 is an explanatory view showing a relationship between the steering device 1 and a position PA of the head of a driver of the vehicle MV. In the vehicle MV, the steering device 1 is provided at a position lower with respect to a vertical direction DV than an assumed position PA where the head of the driver of the vehicle MV is assumed to be present (see an upper section in FIG. 2). The vertical direction DV and a horizontal direction DH are shown in FIGS. 1 and 2. The horizontal direction DH shown in FIGS. 1 and 2 is a direction parallel to the planes of paper. On the other hand, the vertical direction DV shown in FIGS. 1 and 2 is not a direction parallel to the planes of paper.

The steering device 1 includes a gripping part 100, a rotary part 200, a light-emitting part 210, a center member 300, and attachment members 400, 400.

The rotary part 200 is provided in the vehicle MV in a manner allowing rotation of the rotary part 200 about a rotary axis RA (see a center area in a middle section in FIG. 1). The rotary part 200 is rotated by a driver of the vehicle MV via the gripping part 100. A traveling direction of the vehicle MV is designated using the direction of the rotary part 200, namely, an angular position of the rotary part 200. The rotary part 200 includes a so-called spoke part connected to the gripping part 100. In FIG. 1, the center member 300 and the attachment members 400, 400 cover corresponding portions of the rotary part 200.

The center member 300 covers the rotary part 200 and a part of the gripping part 100 from both sides with respect to a direction of the rotary axis RA of the rotary part 200 (see a center area in a middle section in FIG. 1). When the steering device 1 designates a front-facing forward direction as a traveling direction of the vehicle MV, the center member 300 is at a 6 o'clock position and covers a part of the gripping part 100 (see a center area in a lower section in FIG. 1).

The attachment members 400, 400 are attached to the rotary part 200 on the corresponding both sides of the center member 300 (see a middle section in FIG. 1). Specifically, the attachment member 400 is a switch unit for causing a driver to input an instruction for controlling the vehicle MV.

Figure 3:
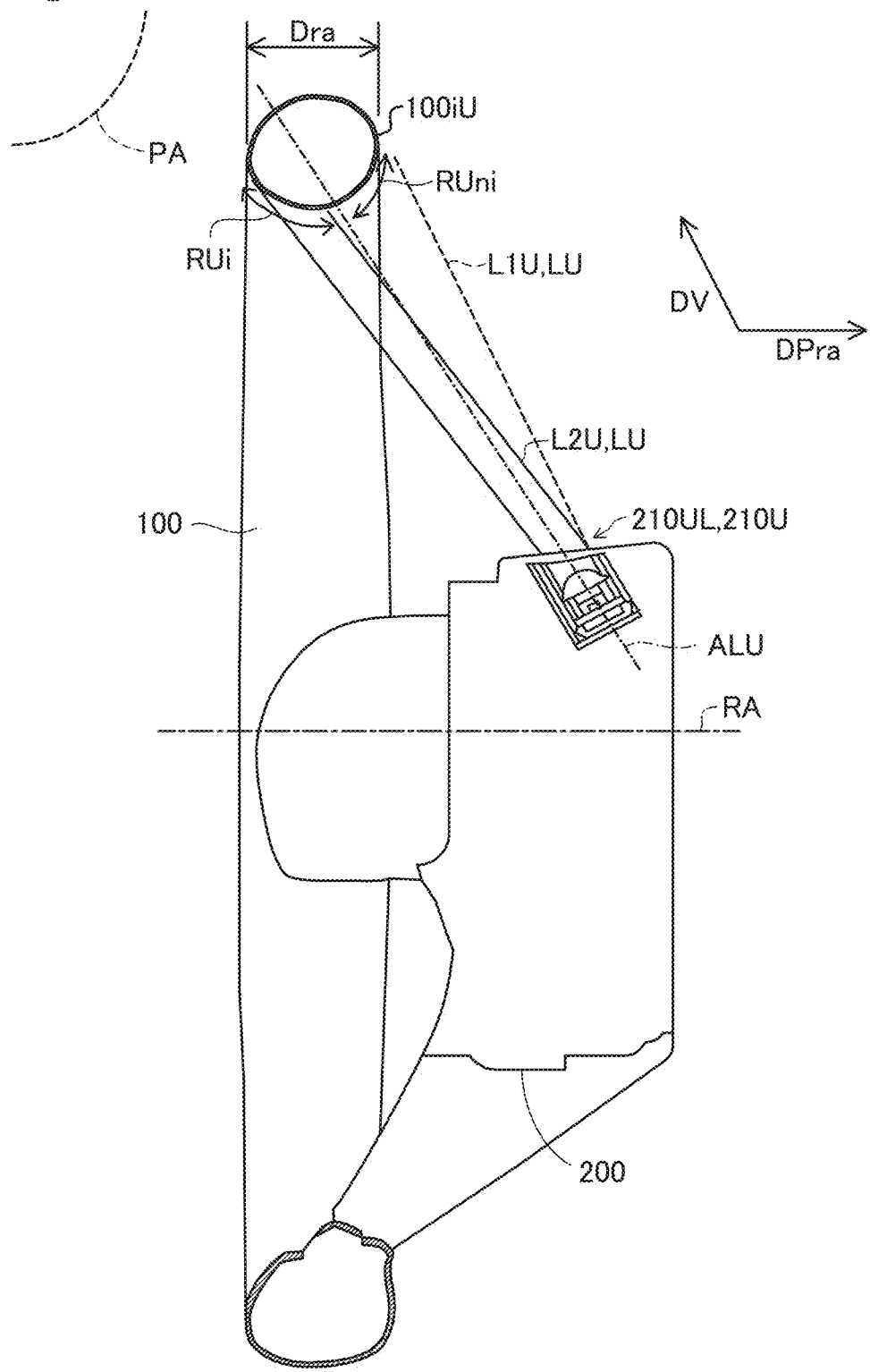
FIG. 3 is a view along a sectional plane III-III in FIG. 2.

FIG. 3 is a view along a sectional plane III-III in FIG. 2. The section III-III is a plane CS1 including a direction parallel to the rotary axis RA and an optical axis ALU of light L1U received at a first surface 216US1 of a light-transmitting cover 216U of a light-emitting part 210UL (see a center area in a middle section in FIG. 2). In the present embodiment, the plane CS1 is a flat plane including a front-facing forward direction of the vehicle MV and the vertical direction DV. The configuration of the light-emitting part 210UL will be described later.

The gripping part 100 is a part to be gripped by a driver of the vehicle MV (see FIG. 1). The gripping part 100 is arranged at a position farther from the rotary axis RA than the rotary part 200 (see a left area in FIG. 3). More specifically, the gripping part 100 has a ring-like shape (see FIGS. 1 and 2). The gripping part 100 is connected to the rotary part 200 at the spoke part of the rotary part 200.

The light-emitting part 210 is provided at the rotary part 200. Specifically, the light-emitting part 210 means four light-emitting parts 210UR, 210UL, 210LR, and 210LL (see a center area in a middle section in FIG. 1 and a center area in a middle section in FIG. 2). In the present specification, if the light-emitting parts 210UR, 210UL, 210LR, and 210LL are described without being distinguished from each other, they will be denoted as the light-emitting part 210.

A2. Configuration and Function of Light-Emitting Part 210U

Each of the light-emitting parts 210UR and 210UL emits light LU toward an upper direction than the horizontal direction DH (see a center area in an upper section in FIG. 1). When the steering device 1 designates a front-facing forward direction as a traveling direction of the vehicle MV, the light-emitting part 210UR and the light-emitting part 210UL are arranged at positions symmetric to each other with respect to a flat plane RS including the rotary axis RA and the vertical direction DV (see a center area in a middle section in FIG. 1). In the present specification, if the light-emitting parts 210UR and 210UL are described without being distinguished from each other, they will be denoted as a light-emitting part 210U.

A part of the gripping part 100 to be illuminated with light from the light-emitting parts 210UR and 210UL is illustrated as an illuminated part 100iU in FIGS. 1 and 3 (see a center area in an upper section in FIG. 1 and a left area in an upper section in FIG. 3). When the steering device 1 designates a front-facing forward direction as a traveling direction of the vehicle MV, the illuminated part 100iU is an arc-like part belonging to the ring-like gripping part 100 and extending in an angular range of about 30 degrees with respect to a direction of a 12 o'clock position (see a center area in an upper section in FIG. 1). The illuminated part 100iU is connected to the spoke part of the rotary part 200 via a part of the gripping part 100 other than the illuminated part 100iU (see FIG. 1).

The gripping part 100 has a ring-like shape. Thus, the illuminated part 100iU corresponding to a part of the gripping part 100 has a size Dra in a direction DPra of the rotary axis RA smaller than a size DdrU of the illuminated part 100iU in a direction DR of rotation (see a left area in an upper section in FIG. 3 and a center area in an upper section in FIG. 1). With respect to the direction DPra of the rotary axis RA, the light-emitting part 210U is located on a side opposite to the assumed position PA about the head of a driver relative to the illuminated part 100iU as an illumination target (see an upper section in FIG. 3).

Figure 4:
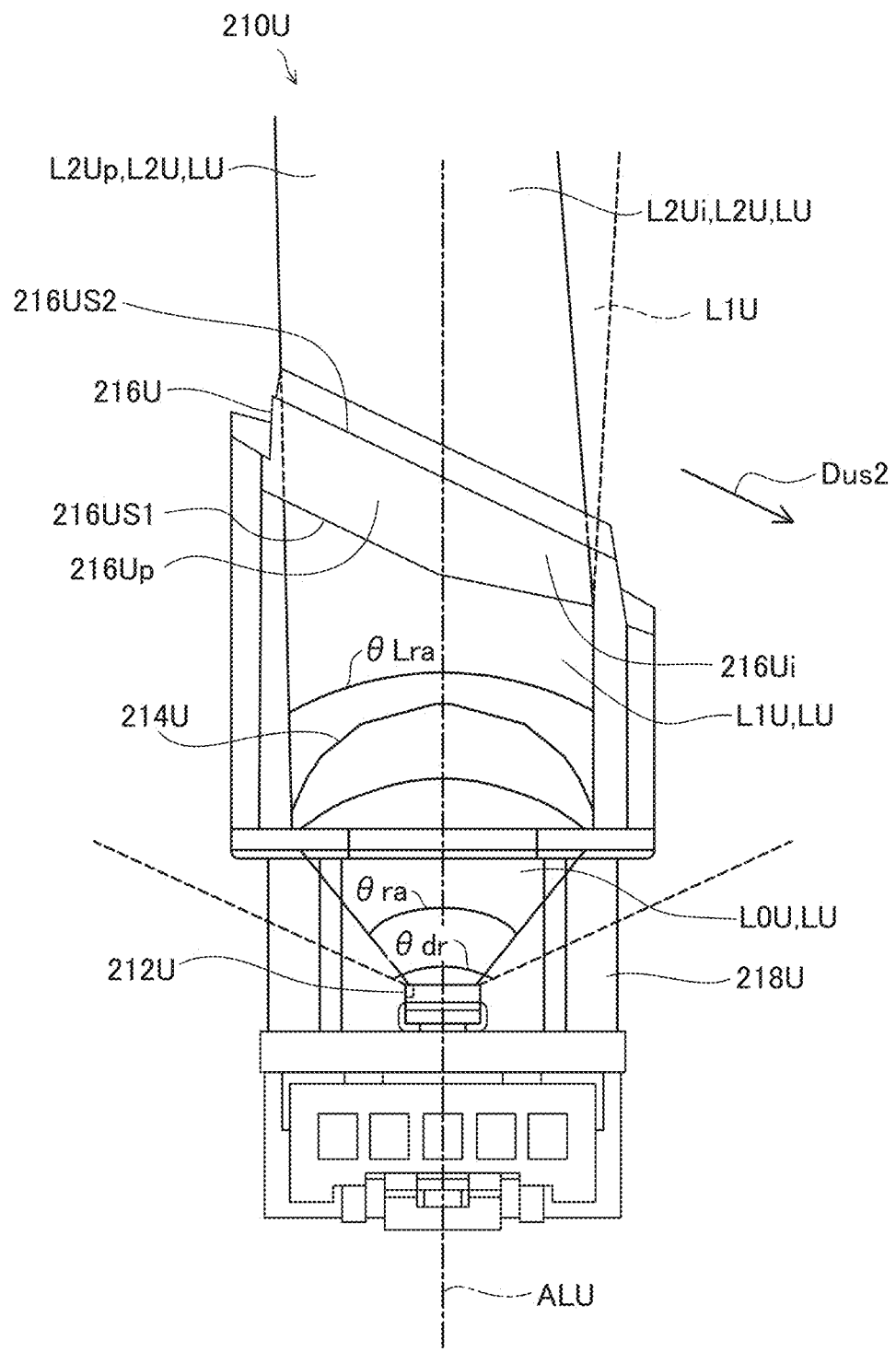
FIG. 4 is an explanatory view showing the configuration of a light-emitting part 210U.

FIG. 4 is an explanatory view showing the configuration of the light-emitting part 210U. The light-emitting part 210UL and the light-emitting part 210UR have the same configuration (see a center area in a middle section in FIG. 2 and a center area in a middle section in FIG. 3). Thus, in the following, the configurations of the light-emitting part 210UL and the light-emitting part 210UR will be described collectively as the configuration of the light-emitting part 210U. The light-emitting part 210U includes a light-emitting element 212U, a lens 214U, a light-transmitting cover 216U, and a support 218U.

The light-emitting element 212U is an element that emits the light LU (see a lower section in FIG. 4). Specifically, the light-emitting element 212U is a light-emitting diode. In the present specification, of the light LU emitted from the light-emitting element 212U and to illuminate the illuminated part 100iU, light emitted from the light-emitting element 212U and to enter the lens 214U is denoted as light L0U. The light-emitting element 212U emits the light L0U of a radial shape having a directivity angle $\theta$dr. In FIGS. 3 and 4, a center axis of the light L0U emitted from the light-emitting element 212U is illustrated as the optical axis ALU. The optical axis ALU has a direction from the light-emitting element 212U toward the illuminated part 100iU as an illumination target.

The lens 214U receives the light L0U from the light-emitting element 212U and emits the received light L0U (see a middle section in FIG. 4). More specifically, of the light L0U emitted from the light-emitting element 212U, the lens 214U receives light in a range of a directivity angle $\theta$ra ($\theta$ra<$\theta$dr) with respect to a direction of the sectional plane CS1 shown in FIG. 4. With respect to a direction of a sectional plane vertical to the sectional plane CS1 shown in FIG. 4, the lens 214U receives the light L0U in a range of the directivity angle $\theta$dr emitted from the light-emitting element 212U. In the present specification, of the light LU emitted from the light-emitting element 212U and to illuminate the illuminated part 100iU, light emitted from the lens 214U and to enter the light-transmitting cover 216U is denoted as the light L1U (see a middle section in FIG. 4).

The lens 214U narrows the directivity angle $\theta$ra of the light L0U emitted from the light-emitting element 212U (see a middle section in FIG. 4). More specifically, with respect to the direction of the sectional plane CS1 in FIG. 4, the lens 214U narrows a light directivity angle to $\theta$Lra ($\theta$Lra<$\theta$ra<$\theta$dr). The lens 214U does not change the optical axis of the received light L0U. Specifically, the optical axis of the light L1U emitted from the lens 214U is the optical axis ALU.

With this configuration, it is possible to enhance an illumination level further at the illuminated part 100iU illuminated with light L2U from the light-emitting part 210U (see a center area in a middle section in FIG. 4). It is further possible to illuminate the illuminated part 100iU effectively having a wide range with respect to the direction DR of rotation (see a center area in an upper section in FIG. 1).

The light L1U emitted from the lens 214U has a direction toward a range covering the following: (i) a portion RUi of the illuminated part 100iU on a side where the assumed position PA about the head of a driver is present with respect to the direction DPra of the rotary axis RA; and (ii) a different portion RUni of the illuminated part 100iU on an opposite side to the side where the assumed position PA is present with respect to the direction DPra of the rotary axis RA (see an upper section in FIG. 3). More specifically, in the sectional plane CS1, the portion RUi is in a range approximately from a 6 o'clock position to an 8 o'clock position of an outer periphery of a sectional plane of the substantially circular illuminated part 100iU. In the sectional plane CS1, the portion RUni is in a range approximately from a 3 o'clock position to a 4:30 position of the outer periphery of the sectional plane of the substantially circular illuminated part 100iU. The portion RUni is a portion invisible to the assumed position PA about the head of a driver.

The support 218U supports the light-emitting element 212U, the lens 214U, and the light-transmitting cover 216U (see a right area in a lower section in FIG. 4). The support 218U fixes the positions of these structures relative to each other.

The light-transmitting cover 216U covers the light-emitting element 212U and the lens 214U (see a middle section in FIG. 4). Specifically, the light-transmitting cover 216U is arranged downstream from the light-emitting element 212U and the lens 214U with respect to a traveling direction of the light LU. The light-transmitting cover 216U transmits light therethrough. Specifically, the light-transmitting cover 216U is made of acrylic. The light-transmitting cover 216U includes the first surface 216US1 and a second surface 216US2.

The first surface 216US1 receives the light LU emitted from the light-emitting element 212U (see a middle section in FIG. 4). More specifically, the light-transmitting cover 216U receives the light L1U at the first surface 216US1 having been emitted from the light-emitting element 212U and transmitted through the lens 214U.

The second surface 216US2 is a surface located on an opposite side to the first surface 216US1 at the light-transmitting cover 216U (see a middle section in FIG. 4). After the light L1U is received at the first surface 216US1, the received light L1U is emitted from the second surface 216US2 toward the illuminated part 100iU (see an upper section in FIG. 4 and an upper section in FIG. 1). In the present specification, of the light LU emitted from the light-emitting element 212U and to illuminate the illuminated part 100iU, light emitted from the second surface 216US2 of the light-transmitting cover 216U toward the illuminated part 100iU is denoted as the light L2U. The second surface 216US2 forms a part of an outer surface of the steering device 1 together with a surface of the center member 300 surrounding the light-transmitting cover 216U of the light-emitting part 210U (see a center area in an upper section in FIG. 1).

The light-transmitting cover 216U includes an inclined portion 216Ui and a plate portion 216Up (see a middle section in FIG. 4).

The inclined portion 216Ui is configured in such a manner that, as getting farther from the illuminated part 100iU along the second surface 216US2, the first surface 216US1 gets closer to the second surface 216US2 in the sectional plane CS1 (see a right area in a middle section in FIG. 4 and a middle section in FIG. 3). In the sectional plane CS1, a direction of getting farther from the illuminated part 100iU along the second surface 216US2 is illustrated as a direction Dus2 in FIG. 4.

With this configuration, the light L1U emitted from the light-emitting element 212U and to be transmitted through the inclined portion 216Ui of the light-transmitting cover 216U is refracted from a traveling direction of the light L1U in entering the light-transmitting cover 216U and in exiting from the light-transmitting cover 216U. As a result, the light LU emitted from the light-emitting element 212U is given a directional component in the direction DPra of the rotary axis RA by the light-transmitting cover 216U, and is bent (see an upper section in FIG. 3). Thus, by configuring the inclined portion 216Ui of the light-transmitting cover 216U properly, it becomes possible to emit the light L2U in a proper direction to the illuminated part 100iU having the size Dra in the direction DPra of the rotary axis RA smaller than the size DdrU thereof in the direction DR of rotation. As a result, it is possible to illuminate an intended portion of the illuminated part 100iU brightly.

Specifically, with respect to the direction DPra of the rotary axis RA, the light L2U emitted from the second surface 216US2 of the light-transmitting cover 216U illuminates the portion RUi of the illuminated part 100iU on a side where the assumed position PA is present (see an upper section in FIG. 3). With respect to the direction DPra of the rotary axis RA, the light L2U emitted from the second surface 216US2 of the light-transmitting cover 216U does not illuminate the different portion RUni of the illuminated part 100iU on an opposite side to the side where the assumed position PA is present (see a left area in an upper section in FIG. 3).

With this configuration, it is possible for the light L2U emitted from the light-emitting part 210U to be applied concentratedly to the portion RUi of the illuminated part 100iU easily visible to a driver without illuminating the portion RUni of the illuminated part 100iU less visible to the driver. As a result, it is possible to efficiently illuminate the portion to be visually recognized by the driver with the light L2U emitted from the light-emitting part 210U.

In the present embodiment, the light-transmitting cover 216U fulfills the function of giving a directional component in the direction DPra of the rotary axis RA to the entering light L2U using the shape of the first surface 216US1 from the first surface 216US1 and the second surface 216US2. This allows the second surface 216US2 forming a part of the outer surface of the steering device 1 to be formed into an arbitrary shape in response to a request such as a request in terms of a design of the steering device 1, for example, other than a request for adjusting an emission direction of the light L2U to illuminate the illuminated part 100iU. The second surface 216US2 at the inclined portion 216Ui has a shape smoothly connected along its outer periphery to the surface of the center member 300 surrounding the light-transmitting cover 216U of the light-emitting part 210U. In the present specification, "smoothly connected" means a differentiable shape.

In the sectional plane CS1, the plate portion 216Up is in a side of the illuminated part 100iU relative to the inclined portion 216Ui with respect to the direction DPra of the rotary axis RA (see a left area in a middle section in FIG. 4 and a left area in an upper section in FIG. 3). At the plate portion 216Up, a distance between the first surface 216US1 and the second surface 216US2 is constant. The second surface 216US2 also has a shape at the plate portion 216Up smoothly connected along its outer periphery to the surface of the center member 300 surrounding the light-transmitting cover 216U of the light-emitting part 210U. The first surface 216US1 has a shape that defines a constant distance from the second surface 216US2 having the mentioned shape. A distance between the first surface 216US1 and the second surface 216US2 is a distance measured in a direction vertical to the second surface 216US2 from each point on the second surface 216US2 to the first surface 216US1.

The light-transmitting cover 216U is arranged relative to the light-emitting element 212U and the lens 214U in such a manner as to receive the light LU emitted from the light-emitting element 212U at the first surface 216US1 belonging to the inclined portion 216Ui and at the first surface 216US1 belonging to the plate portion 216Up. The optical axis ALU of the emitted light LU emitted from the light-emitting element 212U s pointed toward the illuminated part 100$i$U (see a center area in a middle section in FIG. 4).

With this configuration, light L2Up emitted from the light-emitting element 212U and transmitted through the plate portion 216Up of the light-transmitting cover 216U exits the light-transmitting cover 216U in a direction parallel to a direction of entry into the light-transmitting cover 216U. Meanwhile, light L2Ui emitted from the light-emitting element 212U and transmitted through the inclined portion 216Ui of the light-transmitting cover 216U is given a directional component that makes the light L2Ui approach the light L2Up emitted from the plate portion 216Up, and is bent. Thus, by configuring the inclined portion 216Ui of the light-transmitting cover 216U properly, it becomes possible to illuminate the illuminated part 100$i$U with the light L2U in such a manner that light emitted from the plate portion 216Up and light emitted from the inclined portion 216Ui overlap each other on the illuminated part 100$i$U to improve brightness further on the illuminated part 100$i$U.

A3. Configuration and Function of Light-Emitting Part 210L

Each of the light-emitting parts 210LR and 210LL emits light LL toward a lower direction than the horizontal direction DH (see a lower section in FIG. 1). When the steering device 1 designates a front-facing forward direction as a traveling direction of the vehicle MV, the light-emitting part 210LR and the light-emitting part 210LL are arranged at positions symmetric to each other with respect to the flat plane RS including the rotary axis RA and the vertical direction DV (see a center area in a lower section in FIG. 1). In the present specification, if the light-emitting parts 210LR and 210LL are described without being distinguished from each other, they will be denoted as a light-emitting part 210L. If the light LL emitted from the light-emitting part 210L and the light LU emitted from the light-emitting part 210U are described without being distinguished from each other, they will be denoted as light L.

Figure 5:
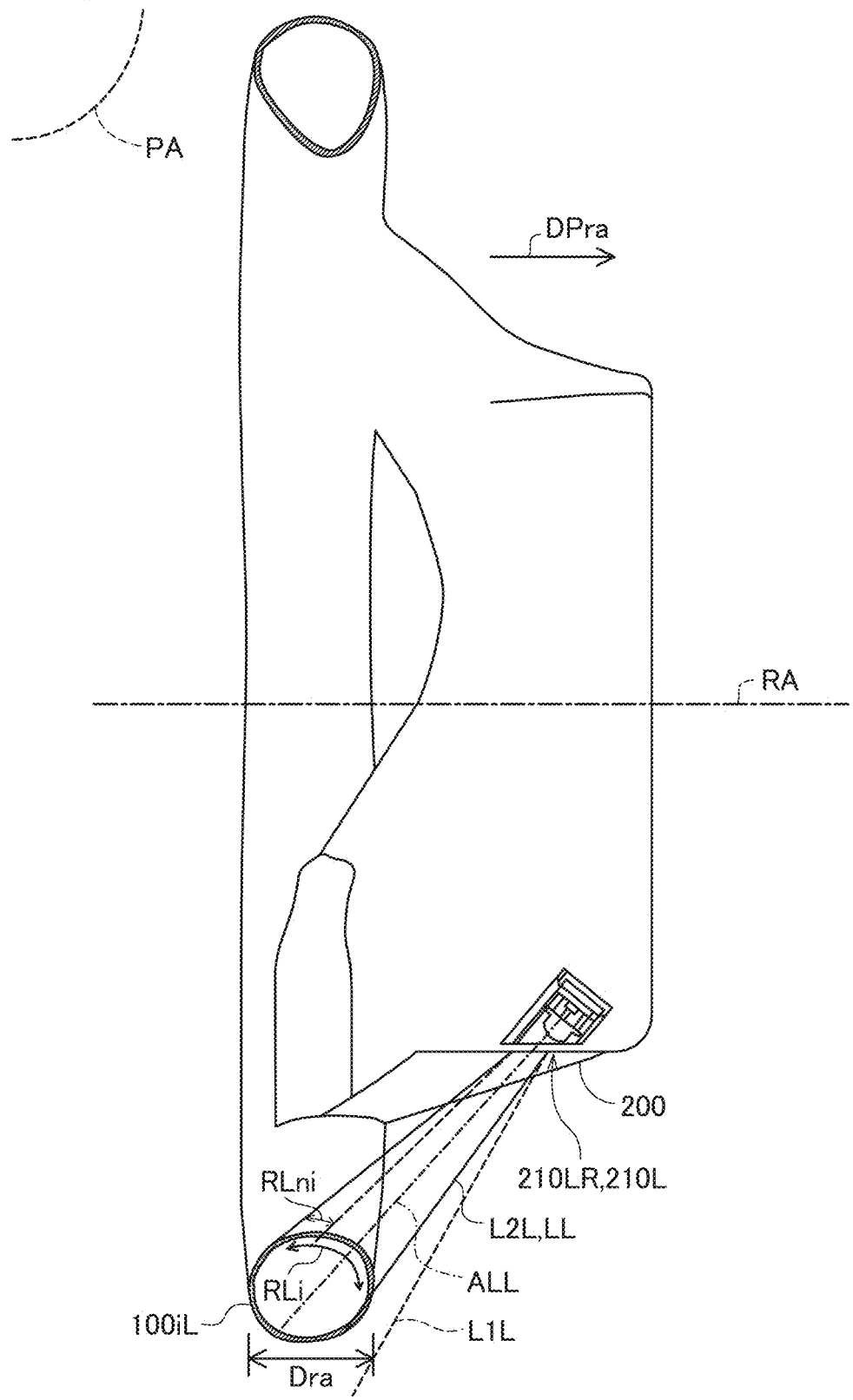
FIG. 5 is a view along a sectional plane V-V in FIG. 2.

Parts of the gripping part 100 to be illuminated with light from the light-emitting part 210LR and light from the light-emitting part 210LL are illustrated as illuminated parts 100$i$L, 100$i$L in FIG. 1 (see a lower section in FIG. 1 and a lower section in FIG. 5). The illuminated parts 100$i$L, 100$i$L are located on both sides of a part of the gripping part 100 covered by the center member 300. When the steering device 1 designates a front-facing forward direction as a traveling direction of the vehicle, one of the illuminated parts 100$i$L, 100$i$L is an arc-like part belonging to the ring-like gripping part 100 and extending in an angular range of about 20 degrees with respect to a direction of a 7 o'clock position (see a left area in a lower section in FIG. 1).

The other of the illuminated parts 100$i$L, 100$i$L is an arc-like part belonging to the ring-like gripping part 100 and extending in an angular range of about 20 degrees with respect to a direction of a 5 o'clock position (see a right area in a lower section in FIG. 1).

FIG. 5 is a view along a sectional plane V-V in FIG. 2. The sectional plane V-V is a plane CS2 including a direction parallel to the rotary axis RA and an optical axis ALL of light L1L received at a first surface 216LS1 of a light-transmitting cover 216L of the light-emitting part 210LR. The configuration of the light-emitting part 210LR will be described later.

Figure 6:
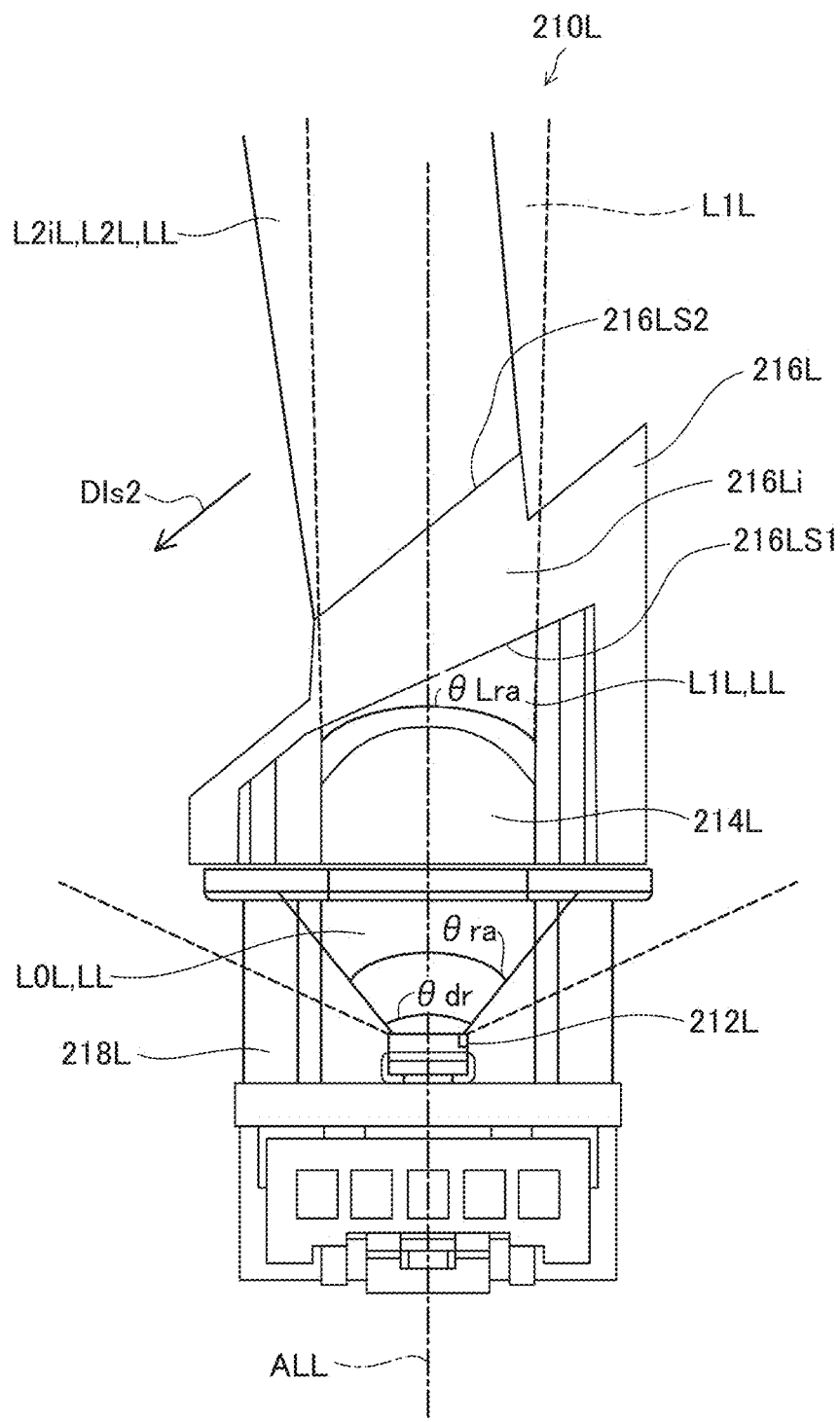
FIG. 6 is an explanatory view showing the configuration of a light-emitting part 210L.

FIG. 6 is an explanatory view showing the configuration of the light-emitting part 210L. The light-emitting part 210LL and the light-emitting part 210LR have the same configuration (see a center area in a middle section in FIG. 2 and a center area in a lower section in FIG. 5). Thus, in the following, the configurations of the light-emitting part 210LL and the light-emitting part 210LR will be described collectively as the configuration of the light-emitting part 210L. The light-emitting part 210L includes a light-emitting element 212L, a lens 214L, a light-transmitting cover 216L, and a support 218L.

The light-emitting element 212L is an element that emits the light LL (see a lower section in FIG. 6). In the present specification, of the light LL emitted from the light-emitting element 212L and to illuminate the illuminated part 100$i$L, light emitted from the light-emitting element 212L and to enter the lens 214L is denoted as light LOL. The configuration and function of the light-emitting element 212L are the same as the configuration and function of the light-emitting element 212U (see a lower section in FIG. 4). In FIGS. 5 and 6, a center axis of the light LOL emitted from the light-emitting element 212L is illustrated as the optical axis ALL. The optical axis ALL has a direction from the light-emitting element 212L toward the illuminated part 100$i$L.

The lens 214L receives the light LOL from the light-emitting element 212L and emits the received light LOL (see a middle section in FIG. 6). The configuration and function of the lens 214L are the same as the configuration and function of the lens 214U (see a middle section in FIG. 4). In the present specification, of the light LL emitted from the light-emitting element 212L and to illuminate the illuminated part 100$i$L, light emitted from the lens 214L and to enter the light-transmitting cover 216L is denoted as the light L1L (see a middle section in FIG. 6). The lens 214L does not change the optical axis of the received light LOL. Specifically, the optical axis of the light L1L emitted from the lens 214L is the optical axis ALL.

The light L1L emitted from the lens 214L has a direction toward a range not covering a portion RLni of the illuminated part 100$i$L on a side where the assumed position PA about the head of a driver is present with respect to the direction DPra of the rotary axis RA (see a lower section in FIG. 5). More specifically, in the sectional plane CS2, the portion RLni is in a range approximately from a 10 o'clock position to a 12 o'clock position of an outer periphery of a sectional plane of the substantially circular illuminated part 100$i$L.

The support 218L supports the light-emitting element 212L, the lens 214L, and the light-transmitting cover 216L (see a left area in a lower section in FIG. 6). The support 218L fixes the positions of these structures relative to each other.

The light-transmitting cover 216L covers the light-emitting element 212L and the lens 214L (see a middle section in FIG. 6). Specifically, the light-transmitting cover 216L is arranged downstream from the light-emitting element 212L and the lens 214L with respect to a traveling direction of the light LL. The light-transmitting cover 216L transmits light therethrough. More specifically, the light-transmitting cover 216L is made of acrylic. The light-transmitting cover 216L includes the first surface 216LS1 and a second surface 216LS2.

The first surface 216LS1 receives the light LL emitted from the light-emitting element 212L (see a middle section in FIG. 6). More specifically, the light-transmitting cover 216L receives the light L1L at the first surface 216LS1 having been emitted from the light-emitting element 212L and transmitted through the lens 214L.

The second surface 216LS2 is a surface located on an opposite side to the first surface 216LS1 at the light-transmitting cover 216L (see a middle section in FIG. 6). After the light L1L is received at the first surface 216LS1, the received light L1L is emitted from the second surface 216LS2 toward the illuminated part 100iL (see an upper section in FIG. 6 and a lower section in FIG. 1). In the present specification, of the light LL emitted from the light-emitting element 212L and to illuminate the illuminated part 100iL, light emitted from the second surface 216LS2 of the light-transmitting cover 216L toward the illuminated part 100iL is denoted as light L2L. A part of the second surface 216LS2 forms a part of the outer surface of the steering device 1 together with the surface of the center member 300 surrounding the light-transmitting cover 216L of the light-emitting part 210L (see a center area in a lower section in FIG. 1).

The light-transmitting cover 216L includes a inclined portion 216Li (see a middle section in FIG. 6). The light-transmitting cover 216L does not include a structure corresponding to the plate portion 216Up of the light-transmitting cover 216U (see a left area in a middle section in FIG. 4).

The inclined portion 216Li is configured in such a manner that, as getting farther from the illuminated part 100iL along the second surface 216LS2, the first surface 216LS1 gets closer to the second surface 216LS2 in the sectional plane CS2 (see a right area in a middle section in FIG. 6 and a lower section in FIG. 5). In the sectional plane CS2, a direction of getting farther from the illuminated part 100iL along the second surface 216LS2 is illustrated as a direction Dls2 in FIG. 6.

The light L2L emitted from the second surface 216LS2 of the light-transmitting cover 216L illuminates the portion RLni not to be illuminated if the light L1L from the lens 214L is emitted as it is (see a lower section in FIG. 5). More specifically, in the sectional plane CS2, a portion RLi to be illuminated with the light L2L emitted from the light-transmitting cover 216L is in a range approximately from a 10 o'clock position to a 3 o'clock position of the outer periphery of the sectional plane of the substantially circular illuminated part 100iL.

In this configuration, the light emitted from the light-emitting element 212L and transmitted through the inclined portion 216Li of the light-transmitting cover 216L is given a directional component pointed toward the illuminated part 100iL, and is bent. Thus, by configuring the inclined portion 216Li of the light-transmitting cover 216L properly, it becomes possible to emit the light L2L in a proper direction to the illuminated part 100iL. Specifically, it is possible for the portion RLi of the illuminated part 100iL including the portion RLni easily visible to a driver to be illuminated with the light L2L emitted from the light-emitting part 210L. As a result, it is possible to efficiently illuminate the portion to be visually recognized by the driver with the light L2L emitted from the light-emitting part 210L.

A4. Effects of First Embodiment

According to the present embodiment, the light LU and the light LL emitted from the light-emitting elements 212U and 212L and to be transmitted through the inclined portions 216Ui and 216Li of the light-transmitting covers 216U and 216L are refracted from respective traveling directions of the light LU and the light LL in entering the light-transmitting covers 216U and 216L and in exiting from the light-transmitting covers 216U and 216L (see FIGS. 4 and 6). As a result, the light LU and the light LL emitted from the light-emitting elements 212U and 212L are given directional components in the direction DPra of the rotary axis RA by the light-transmitting covers 216U and 216L, and are bent to the directions Dus2 and Dls2 respectively (see an upper section in FIG. 4 and an upper section in FIG. 6). Thus, by configuring the inclined portions 216Ui and 216Li of the light-transmitting covers 216U and 216L properly, it becomes possible to emit the light LU and the light LL in proper directions to the illuminated parts 100iU and 100iL both having the size Dra in the direction DPra of the rotary axis RA smaller than the size DdrU and a size DdrL thereof respectively in the direction DR of rotation (see an upper section in FIG. 3 and a lower section in FIG. 5). As a result, it is possible to illuminate the illuminated parts 100iU and 100iL brightly (see an upper section and a lower section in FIG. 1). The "direction of rotation" is the direction along the trajectory drawn as the object rotates about a central axis outside the object.

The inclined portions 216Ui and 216Li are configured in such a manner that, as getting farther from the illuminated parts 100iU and 100iL along the second surfaces 216US2 and 216LS2, the first surfaces 216US1 and 216LS1 get closer to the second surfaces 216US2 and 216LS2 (see a middle section in FIG. 4 and a middle section in FIG. 6). Specifically, the light-transmitting covers 216U and 216L fulfill the functions of giving directional components in the direction DPra of the rotary axis RA to the entering light LU and the entering light LL using the shapes of the first surfaces 216US1 and 216LS1 from the first surfaces 216US1 and 216LS1 and the second surfaces 216US2 and 216LS2 (see a middle section in FIG. 4 and a middle section in FIG. 6). This allows the second surfaces 216US2 and 216LS2 forming parts of the outer surface of the steering device 1 to be formed into arbitrary shapes in response to a request other than a request for emission directions of the light LU and the light LL to illuminate the illuminated parts 100iU and 100iL.

Furthermore, according to the present embodiment, the lenses 214U and 214L fulfill the functions of enhancing illumination levels by collecting the light L0U and the light L0L emitted from the light-emitting elements 212U and 212L, and the light-transmitting covers 216U and 216L fulfill the functions of correctly determining the directions of the light L2U and the light L2L to be emitted toward the illuminated parts 100iU and 100iL. Thus, by changing the configurations of the first surfaces 216US1 and 216LS1 of the light-transmitting covers 216U and 216L in response to the type of the vehicle MV, it becomes possible to illuminate the illuminated parts 100iU and 100iL of the steering device 1 brightly in several types of the vehicles MV without changing the configurations of the lenses 214U and 214L.

The vehicle MV in the present embodiment is also called a "moving object." Each of the illuminated parts 100*i*U and 100*i*L is also called a "peripheral part."

B. Other Embodiments

B1. Other Embodiments 1

(1) In the above-described embodiment, the light-emitting part 210U includes the lens 214U (see a middle section in FIG. 4). However, the light-emitting part may include another optical element such as a diffraction optical element instead of the lens or in addition to the lens.

(2) In the above-described embodiment, the inclined portion 216Ui is configured in such a manner that, as getting farther from the illuminated part 100*i*U along the second surface 216US2, the first surface 216US1 gets closer to the second surface 216US2 in the sectional plane CS1 (see a right area in a middle section in FIG. 4 and a middle section in FIG. 3). However, the inclined portion may be configured in such a manner that, as the inclined portion gets farther from the illuminated part as a peripheral part along the second surface, the first surface gets farther from the second surface in a sectional plane including a direction parallel to the rotary axis and the optical axis of light received at the first surface.

In this embodiment, the light emitted from the light-emitting element and to be transmitted through the inclined portion of the light-transmitting cover is also refracted from a traveling direction of the light in entering the light-transmitting cover and in exiting from the light-transmitting cover. As a result, the light emitted from the light-emitting element is given a directional component in the direction of the rotary axis by the light-transmitting cover, and is bent. Thus, by configuring the inclined portion of the light-transmitting cover properly in a steering device according to one embodiment, it becomes possible to emit the light in a proper direction to the illuminated part as the peripheral part having a size in the direction of the rotary axis smaller than the size thereof in the direction of rotation. As a result, it is possible to illuminate the peripheral part brightly.

In the above-described embodiment, the light L1L emitted from the lens 214L is applied while being shifted from the gripping part 100 toward the direction DPra (see a lower section in FIG. 5). By contrast, according to an embodiment where light emitted from the lens 214L is applied while being shifted from the gripping part 100 toward an opposite side to the direction DPra, it is preferable to configure the inclined portion in the manner described above. Specifically, it is preferable that the inclined portion be configured in such a manner that, as the inclined portion gets farther from the illuminated part, the first surface gets farther from the second surface. According to this embodiment, a direction of the light emitted from the lens 214L is changed to a direction pointed toward the illuminated part.

(3) In the above-described embodiment, the gripping part 100 has a ring-like shape (see FIGS. 1 and 2). However, the gripping part 100 may have a shape other than a ring-like shape and may be a shape with right and left parts independent of each other, for example.

B2. Other Embodiments 2

In the above-described embodiment, the light-transmitting cover 216U includes the inclined portion 216Ui and the plate portion 216Up (see a middle section in FIG. 4). However, this light-transmitting cover may have a configuration without a plate portion, like in the light-emitting part 210L (see a middle section in FIG. 6).

B3. Other Embodiments 3

In the above-described embodiment, with respect to the direction DPra of the rotary axis RA, the light L2U emitted from the second surface 216US2 of the light-transmitting cover 216U does not illuminate the different portion RUni of the illuminated part 100*i*U on an opposite side to the side where the assumed position PA is present (see a center area in an upper section in FIG. 3). However, with respect to the direction DPra of the rotary axis RA, the light L2U emitted from the second surface 216US2 of the light-transmitting cover 216U may illuminate at least a part of a portion of the illuminated part 100*i*U on an opposite side to the side where the assumed position PA is present.

B4. Other Embodiments 4

In the above-described embodiment, the light L1L emitted from the lens 214L is pointed toward a range not covering the portion RLni of the illuminated part 100*i*L on a side where the assumed position PA about the head of a driver is present with respect to the direction DPra of the rotary axis RA (see a lower section in FIG. 5). In the sectional plane CS2, the portion RLni is in a range approximately from a 10 o'clock position to a 12 o'clock position of the outer periphery of the sectional plane of the substantially circular illuminated part 100*i*L.

However, the light L1L emitted from the lens 214L may be pointed toward a range not covering a different portion such as a portion in a range from a 2 o'clock position to a 3 o'clock position, for example, of the outer periphery of the sectional plane of the substantially circular illuminated part 100*i*L. In another case, the light L1L may be pointed toward a range covering the substantially circular illuminated part 100*i*L entirely.

B5. Other Embodiments 5

In the above-described embodiment, the light-emitting part 210U includes the lens 214U. However, the light-emitting part may be configured without a lens. Specifically, light to be received at the first surface of the light-transmitting cover may be received by the light-transmitting cover directly from the light-emitting element, or may be received via a different optical structure such as a lens given as an example in the above-described embodiment.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

B6. Other Embodiments 6

The present disclosure is feasible in the following aspects.
(1) According to one aspect of the present disclosure, a steering device for a moving object is provided. The steering device comprises: a rotary part provided in the moving object in a manner allowing rotation of the rotary part about a rotary axis; a peripheral part connected to the rotary part, arranged at a position farther from the rotary axis than the rotary part, and having a size in a direction of the rotary axis smaller than a size thereof in a direction of the rotation; and a light-emitting part provided at the rotary part. The light-emitting part includes: a light-emitting element that emits light; and a light-transmitting cover that covers the light-emitting element and transmits the light therethrough. The light-transmitting cover includes: a first surface where the light emitted from the light-emitting element is received; and a second surface located on an opposite side to the first surface, forming a part of an outer surface of the steering device, and emitting the light received at the first surface toward the peripheral part. The light-transmitting cover includes: a inclined portion configured in such a manner that, as getting farther from the peripheral part along the second surface, the first surface gets closer to the second surface in a sectional plane including a direction parallel to the rotary axis and an optical axis of the light received at the first surface, or configured in such a manner that, as getting farther from the peripheral part along the second surface, the first surface gets farther from the second surface in the sectional plane.

In this aspect, the light emitted from the light-emitting element and to be transmitted through the inclined portion of the light-transmitting cover is refracted from a traveling direction of the light in entering the light-transmitting cover and in exiting from the light-transmitting cover. As a result, the light emitted from the light-emitting element is given a directional component in the direction of the rotary axis by the light-transmitting cover, and is bent. Thus, by configuring the inclined portion of the light-transmitting cover properly, it becomes possible to emit the light in a proper direction to the peripheral part having the size in the direction of the rotary axis smaller than the size thereof in the direction of the rotation. As a result, it is possible to illuminate the peripheral part brightly. Furthermore, the inclined portion is configured in such a manner that, as getting farther from the peripheral part along the second surface, the first surface gets closer to the second surface, or configured in such a manner that, as getting farther from the peripheral part along the second surface, the first surface gets farther from the second surface. Specifically, the light-transmitting cover fulfills the function of giving a directional component in the direction of the rotary axis to the entering light using the shape of the first surface from the first surface and the second surface. This allows the second surface forming a part of the outer surface of the steering device to be formed into an arbitrary shape in response to a request other than a request for an emission direction of the light to illuminate the peripheral part.

(2) The steering device according to the above-described aspect may be configured in an aspect where the light-transmitting cover includes: a plate portion arranged in a side of the peripheral part relative to the inclined portion with respect to the direction of the rotary axis in the sectional plane, the plate portion being a portion where a distance between the first surface and the second surface is constant; the inclined portion is configured in such a manner that, as getting farther from the peripheral part along the second surface, the first surface gets closer to the second surface in the sectional plane; and the light-transmitting cover is arranged relative to the light-emitting element in such a manner as to receive the light emitted from the light-emitting element at the first surface belonging to the inclined portion and at the first surface belonging to the plate portion, wherein the optical axis of the light emitted from the light-emitting element is pointed toward the peripheral part.

In this aspect, the light emitted from the light-emitting element and transmitted through the plate portion of the light-transmitting cover exits the light-transmitting cover in a direction parallel to a direction of entering the light-transmitting cover. Meanwhile, the light emitted from the light-emitting element and transmitted through the inclined portion of the light-transmitting cover is given a directional component that makes the light approach the light emitted from the plate portion, and is bent. Thus, by configuring the inclined portion of the light-transmitting cover properly, it becomes possible to illuminate the peripheral part with light in such a manner as to improve brightness further.

(3) The steering device according to the above-described aspect may be configured in an aspect where the steering device is configured in such a manner that: the light received at the first surface is pointed toward a range covering a portion of the peripheral part on a side where an assumed position about the head of a driver of the moving object is present with respect to the direction of the rotary axis, and a different portion of the peripheral part on an opposite side to the side where the assumed position is present with respect to the direction of the rotary axis; and the light emitted from the second surface illuminates the portion and does not illuminate the different portion.

In this aspect, it is possible for the light emitted from the light-emitting part to be applied concentratedly to the portion of the peripheral part easily visible to a driver without illuminating the portion of the peripheral part less visible to the driver. As a result, it is possible to efficiently illuminate the portion to be visually recognized by the driver with the light emitted from the light-emitting part.

(4) The steering device according to the above-described aspect may be configured in an aspect where the inclined portion is configured in such a manner that, as getting farther from the peripheral part along the second surface, the first surface gets closer to the second surface in the sectional plane, and the steering device is configured in such a manner that: the light received at the first surface is pointed toward a range not covering a portion of the peripheral part on a side where an assumed position about the head of a driver of the moving object is present with respect to the direction of the rotary axis; and the light emitted from the second surface illuminates the portion.

In this aspect, the light emitted from the light-emitting element and transmitted through the inclined portion of the light-transmitting cover is given a directional component pointed toward the peripheral part, and is bent. Thus, by configuring the inclined portion of the light-transmitting cover properly, it becomes possible to emit the light in a proper direction to the peripheral part. Specifically, it is possible for the portion of the illuminated part easily visible to a driver to be illuminated with the light emitted from the light-emitting part. As a result, it is possible to efficiently illuminate the portion to be visually recognized by the driver with the light emitted from the light-emitting part.

(5) The steering device according to the above-described aspect may be configured in an aspect where the light-emitting part includes: a lens that receives the light from the light-emitting element and emits the received light, and narrows a directivity angle of the light emitted from the light-emitting element, and the light-transmitting cover receives the light at the first surface having been emitted from the light-emitting element and transmitted through the lens.

In this aspect, it is possible to enhance an illumination level further at the peripheral part illuminated with the light from the light-emitting part.

Furthermore, in this aspect, the lens fulfills the function of enhancing an illumination level by collecting the light emitted from the light-emitting element, and the light-transmitting cover fulfills the function of correctly determining the direction of the light to be emitted toward the peripheral part. Thus, by changing the configuration of the first surface of the light-transmitting cover in response to the type of the moving object, it becomes possible to illuminate the peripheral part of the steering device brightly in several types of the moving objects without changing the configuration of the lens.

The present disclosure is feasible in various aspects other than the steering device. For example, the present disclosure is feasible in aspects including a method of manufacturing a steering device, a method of designing a steering device, and a method of illuminating an elongated shape target, and others.

What is claimed is:

1. A steering device for a moving object, comprising:
a rotary part provided in the moving object in a manner allowing rotation of the rotary part about a rotary axis;
a peripheral part connected to the rotary part, arranged at a position farther from the rotary axis than the rotary part, and having a size in a direction of the rotary axis smaller than a size thereof in a direction of the rotation; and
a light-emitting part provided at the rotary part, wherein the light-emitting part includes:
a light-emitting element that emits light; and
a light-transmitting cover that covers the light-emitting element and transmits the light therethrough,
the light-transmitting cover includes:
a first surface where the light emitted from the light-emitting element is received; and
a second surface located on an opposite side to the first surface, forming a part of an outer surface of the steering device, and emitting the light received at the first surface toward the peripheral part, and
the light-transmitting cover includes:
an inclined portion configured in such a manner that, as getting farther from the peripheral part along the second surface, the first surface gets closer to the second surface in a sectional plane including a direction parallel to the rotary axis and an optical axis of the light received at the first surface, or configured in such a manner that, as getting farther from the peripheral part along the second surface, the first surface gets farther from the second surface in the sectional plane.

2. A steering device for a moving object, comprising:
a rotary part provided in the moving object in a manner allowing rotation of the rotary part about a rotary axis;
a peripheral part connected to the rotary part, arranged at a position farther from the rotary axis than the rotary part, and having a size in a direction of the rotary axis smaller than a size thereof in a direction of the rotation; and
a light-emitting part provided at the rotary part, wherein the light-emitting part includes:
a light-emitting element that emits light; and
a light-transmitting cover that covers the light-emitting element and transmits the light therethrough,
the light-transmitting cover includes:
a first surface where the light emitted from the light-emitting element is received; and
a second surface located on an opposite side to the first surface, forming a part of an outer surface of the steering device, and emitting the light received at the first surface toward the peripheral part,
an inclined portion configured in such a manner that, as getting farther from the peripheral part along the second surface, the first surface gets closer to the second surface in a sectional plane including a direction parallel to the rotary axis and an optical axis of the light received at the first surface, and
a plate portion arranged in a side of the peripheral part relative to the inclined portion with respect to the direction of the rotary axis in the sectional plane, the plate portion being a portion where a distance between the first surface and the second surface is constant, wherein
the light-transmitting cover is arranged relative to the light-emitting element in such a manner as to receive the light emitted from the light-emitting element at the first surface belonging to the inclined portion and at the first surface belonging to the plate portion, wherein the optical axis of the light emitted from the light-emitting element is pointed toward the peripheral part.

3. The steering device according to claim 2, wherein the steering device is configured in such a manner that:
the light received at the first surface is pointed toward a range covering a portion of the peripheral part on a side where an assumed position about the head of a driver of the moving object is present with respect to the direction of the rotary axis, and a different portion of the peripheral part on an opposite side to the side where the assumed position is present with respect to the direction of the rotary axis; and
the light emitted from the second surface illuminates the portion and does not illuminate the different portion.

4. A steering device for a moving object, comprising:
a rotary part provided in the moving object in a manner allowing rotation of the rotary part about a rotary axis;
a peripheral part connected to the rotary part, arranged at a position farther from the rotary axis than the rotary part, and having a size in a direction of the rotary axis smaller than a size thereof in a direction of the rotation; and
a light-emitting part provided at the rotary part, wherein the light-emitting part includes:
a light-emitting element that emits light; and
a light-transmitting cover that covers the light-emitting element and transmits the light therethrough,
the light-transmitting cover includes:
a first surface where the light emitted from the light-emitting element is received;
a second surface located on an opposite side to the first surface, forming a part of an outer surface of the steering device, and emitting the light received at the first surface toward the peripheral part; and
an inclined portion configured in such a manner that, as getting farther from the peripheral part along the second surface, the first surface gets closer to the second surface in a sectional plane including a direction parallel to the rotary axis and an optical axis of the light received at the first surface, and
the steering device is configured in such a manner that:
the light received at the first surface is pointed toward a range not covering a portion of the peripheral part on a side where an assumed position about the head of a driver of the moving object is present with respect to the direction of the rotary axis; and the light emitted from the second surface illuminates the portion.

5. The steering device according to claim 1, wherein the light-emitting part includes:

a lens that receives the light from the light-emitting element and emits the received light, and narrows a directivity angle of the light emitted from the light-emitting element, and the light-transmitting cover receives the light at the first surface having been emitted from the light-emitting element and transmitted through the lens.

\* \* \* \* \*